United States Patent [19]
Kunii

[11] Patent Number: 5,438,447
[45] Date of Patent: Aug. 1, 1995

[54] OPTICAL DEFLECTOR

[75] Inventor: Yoshimasa Kunii, Saitama, Japan

[73] Assignee: Fuji Xerox Co., Ltd., Tokyo, Japan

[21] Appl. No.: 127,728

[22] Filed: Sep. 28, 1993

[30] Foreign Application Priority Data

Sep. 29, 1992 [JP] Japan .................. 4-259457

[51] Int. Cl.⁶ .............................. G02B 26/08
[52] U.S. Cl. .................. 359/200; 359/212;
359/226; 359/508
[58] Field of Search ............... 359/198, 200, 212, 213,
359/214, 216, 507, 508, 512; 310/67 R, 88, 90, 90.5

[56] References Cited

FOREIGN PATENT DOCUMENTS

| | | |
|---|---|---|
| 56-101120 | 8/1981 | Japan . |
| 101120 | 8/1981 | Japan .................. 359/200 |
| 59-123824 | 8/1984 | Japan . |
| 59-144817 | 8/1984 | Japan . |
| 62-94814 | 5/1987 | Japan . |
| 62-266515 | 11/1987 | Japan . |
| 63-144613 | 9/1988 | Japan . |
| 1-233413 | 9/1989 | Japan . |
| 2-193354 | 7/1990 | Japan . |
| 2-259718 | 10/1990 | Japan . |
| 3-105815 | 11/1991 | Japan . |

OTHER PUBLICATIONS

Lambiotte and Yates, IBM Technical Disclosure Bulletin vol. 18 No. 6 Nov. 1975 pp. 1709–1710.

Primary Examiner—Loha Ben
Assistant Examiner—Suma N. Ramaswamy
Attorney, Agent, or Firm—Finnegan, Henderson Farabow, Garrett & Dunner

[57] ABSTRACT

The improved optical deflector including a rotating shaft that is supported freely rotatable around the body of a motor, as well as an optical deflecting element and a magnet that are both fitted around the rotating shaft is further provided with a turbulence forming member in the neighborhood of the rotating element which is composed of the rotating shaft, the optical deflecting element and the magnet. The air stream generated by the rotation of the optical deflecting element is transformed to turbulences so as to block the development of a "negative" pressure in the space between a stator coil base (fixed member) and the magnet (rotating member). Therefore, the grease can be prevented from splashing in the optical deflector that uses ball bearings; in the case where the optical deflector is of a type that uses a dynamic pressure spindle, the galling of the spindle can be prevented.

4 Claims, 6 Drawing Sheets

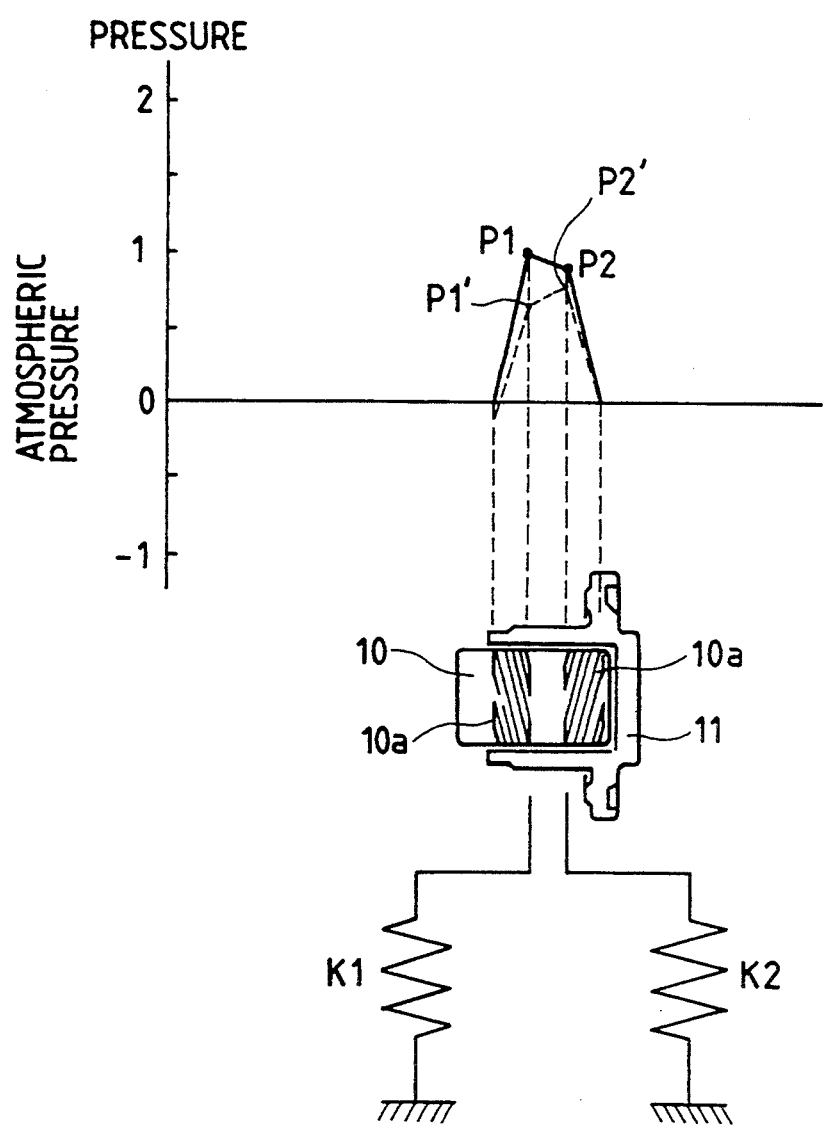

OPTICAL DEFLECTOR

BACKGROUND OF THE INVENTION

The present invention relates to an optical deflector in an optical scanning unit for use on laser printers, digital copiers, laser facsimiles, POS terminals or the like.

FIG. 5 shows a typical construction of the optical scanning unit for which the optical deflector of the present invention is to be used. A light beam emitting from a light source such as a semiconductor laser (not shown) arrives at a polygonal mirror 3 in the optical deflector 1. The polygonal mirror 3 which is rotated by a motor 2 deflects the incident beam to produce a scanning beam B. The beam B passes through an imaging lens group 5 for producing the right image on a subject 4 to be scanned. The beam further passes through a dustproof glass window 6 to reach the subject 4, thereby forming a latent electrostatic image in accordance with the electrophotographic process or performing exposure on a film which is popular at present. The motor 2 is typically a DC brushless motor and screwed to an optical box 7. A cover 8 is provided to remove dust in the whole of the unit.

The conventional optical deflector typically uses a coreless motor which does not have a core in the stator. The construction and operation of the conventional optical deflector are described below with reference to FIGS. 6(A) to 6(C) and FIG. 8.

Each of FIGS. 6(A) to 6(C) shows the conventional optical deflector that uses a dynamic pressure spindle as a bearing. As shown in FIG. 6(A), a stationary shaft 10 is secured to the motor body 12 by means of a screw 13. The stationary shaft 10 is made of either stainless steel or plastic material. An outside diameter of the stationary shaft 10 is manufactured to a precision on the sub-micron order. An annular stator yoke 14 which is made of either a ferrous metal or ferrite is secured to the motor body 12 by means of a screw or adhesive. Provided on top of the stator yoke 14 is a stator coil 16 which is secured to a stator coil base 15.

A tubular rotating shaft 11 is fitted over the stationary shaft 10. A flange 17 is formed around the rotating shaft 11 as an integral part. The underside of the flange 17 is worked to form an annular reference face 17a that serves to provide the necessary horizontal precision for the rotating faces of a polygonal mirror 3. The polygonal mirror 3 and a magnet 19 are fitted over the rotating shaft 11 in a position that is below the flange 17. Thus, the rotating shaft 11, the polygonal mirror 3 and the magnet 19 combine to form a rotating element 18. A groove 11a is formed in the lower part of the rotating shaft 11 and a leaf spring 20 is placed between the groove 11a and the magnet 19 to establish elastic engagement. As shown in FIG. 6(B), the leaf spring 20 has an annular shape, with a plurality of engagement lugs 20a and 20b being formed on the inner and outer circumferences, respectively. The inner lugs 20a is engaged with the groove 11a as shown in FIG. 6(C). The outer lugs 20b are elastically urged against the bottom of the magnet 19. The polygonal mirror 3 is fixed in position by the leaf spring 20 which depresses the mirror toward the reference face 17a of the flange 17, with the magnet 19 being interposed.

The outer circumference of the stationary shaft 10 is provided with grooves 10a that are etched in a herringbone pattern. The inner circumference of the rotating shaft 11 is planished by boring to a surface precision on the sub-micron order that is as high as the outside diameter of the stationary shaft 10. The rotation of the shaft 11 combines with the herringbone grooves 10a on the stationary shaft 10 to create a pneumatic dynamic pressure that is sufficient to support the rotating shaft 11 in a radial direction (vertical direction with respect to the rotating center axis). The top of the stationary shaft 10 is provided with a magnet 21 that repels a magnet 22 on the ceiling of the rotating shaft 11 to support the latter in the thrust direction (along the rotating center axis).

FIG. 7 is a graph showing the distribution of dynamic pressure in the direction of the rotating center axis. Symbols K1 and K2 in FIG. 7 denote the rigidity of a bearing and they provide pressure P1 and P2, respectively. This is equivalent to saying that ball bearings are present in the areas where P1 and P2 are produced. These ball bearings constitute a dynamic pressure bearing system.

The dynamic pressure bearing system in the optical deflector described above is of such a type that the stationary shaft 10 is provided on the motor body 12, with the hollow rotating shaft 11 being fitted over the stationary shaft 10. In a second type of optical deflector, it is known to provide a hollow stationary shaft on the motor body, with a rotating shaft being inserted into the stationary one. However, motor design requirements and the need to insure the reliability of the dynamic pressure bearing system have practically ousted this second type from industry and the first type illustrated in FIG. 6(A) is most commonly used today.

Another conventional optical deflector that uses ball bearings is described below with reference to FIG. 8. The components or parts that are the same as those corresponding to the optical deflector shown in FIG. 6(A) are identified by like numerals and not described in detail.

Two ball bearings 23 and 24 are fitted in the space between the stationary shaft 10 and the rotating shaft 11. The top of the rotating shaft 11 is closed with a seal 29 in the form of a high-polymer sheet or a metal plate that is bonded with an adhesive or a tackifier to prevent grease from splashing up out of the shaft 11 as the ball bearings 23 and 24 continue to rotate. The lower part of the rotating shaft 11 is provided with labyrinth grooves 30 in the space between the motor body 12 and the rotating shaft 11. The rotation of the shaft 11 causes air to be alternately compressed and rarefied to form an air curtain that prevents grease from splashing down out of the shaft 11 as the ball bearings 23 and 24 continue to rotate.

The conventional designs shown in FIGS. 6(A) to 6(C) and FIG. 8 have the characteristics listed in the following table 1.

TABLE 1

| Parameter | FIGS. 6(A) to 6(C) | FIG. 8 |
|---|---|---|
| Limit of the distance between opposing faces of the polygonal mirror (in terms of inscribed circle), mm | 70φ | 70φ |
| Limit of the average thickness of the polygonal mirror, mm | 10 | 10 |
| Limit of the outside diameter of the magnet, mm | 50φ | 50φ |
| Average thickness of the | 5 | 5 |

TABLE 1-continued

| Parameter | FIGS. 6(A) to 6(C) | FIG. 8 |
| --- | --- | --- |
| magnet, mm | | |
| Limit of the rotational speed, rpm | 25,000 | 15,000 |

A problem common to the designs in FIGS. 6(A) to 6(C) and FIG. 8 is that if they are used at rotational speeds exceeding 10,000 rpm, a very strong "whine" is caused by the polygonal mirror 3. In either design shown in FIG. 6(A) or FIG. 8, this problem is solved by a cover 32 fitted with the light-transparent window glass 31 secured to the motor body 12 by a suitable member such as screws (not shown). The cover 32 renders the optical deflector both soundproof and dustproof.

As described above, the conventional optical deflector shown in FIG. 8 has the labyrinth grooves 30 formed in the lower part of the rotating shaft 11 so that grease does not splash down as the ball bearings 23 and 24 continue to rotate. However, if the optical deflector is operated in a hot (60° C.) environment at a rotational speed exceeding 10,000 rpm, splashes of grease 33 (also called an "oil mist") are prone to occur extensively in the directions indicated in FIG. 8. Since the optical deflector forms a closed structure, the splashes of grease 33 are inevitably deposited on the polygonal mirror 3 and the window glass 31 and this has caused inconveniences such as a drop in laser power. Even in the absence of such grease deposition on the polygonal mirror 33 or window glass 31, the splashing of grease has led to a marked shortening of the service life of the ball bearings 23 and 24.

The possible cause of this phenomenon is described below with reference to the graph shown in FIG. 8 which depicts the distribution of air pressure due to the rotation of polygonal mirror 3. As it rotates, the polygonal mirror 3, working like blades of a cross-flow fan, aspirates air both from above and below and the resulting laminar flow of air is ejected to produce pressures that peak at the greatest "positive" value shown in the graph of the FIG. 8. As the reaction to this formation of "positive" pressures, the pressure in the space between the stator coil base 15 and the magnet 19 indicates a very great "negative" value. The pressure performing this pumping operation increases with the rotational speed and outside diameter of the polygonal mirror 3 but decreases with the number of its faces. The pressure in the space between the magnet 19 and the stator coil base 15 is affected by the pumping operation, and indicates a very great "negative" value. This negative pressure, as it combines with the drop in the viscosity of grease at elevated temperature, causes the grease in the lower bearing 24 to overcome the holding effect of the labyrinth grooves 30, with the result that it is easily sucked out of the bearing to cause extensive fouling under the cover 32.

The pumping operation of the polygonal mirror 3 also works in the conventional design shown in FIGS. 6(A) to 6(C) and the dynamic pressure distribution given by the dynamic pressure spindle is deviated from the normal setting indicated by the solid line in FIG. 7 and the actual curve becomes deformed as indicated by the dashed line, producing maximum pressures at P1' and P2'. As a result, the rigidity of the bearing is lowered to cause "galling" on the dynamic pressure spindle.

To prevent the formation of grease splashes 33 in the optical deflector shown in FIG. 8, Unexamined Japanese Patent Publication No. 309066/1991 proposed that a small gap be provided between the rotating shaft and the motor body and that an air steam generating portion as typified by a spiral groove for generating a forced air stream flowing towards the center axis of the rotating element be provided in the wall surface of either the rotating shaft or the motor body. However, when the present inventors conducted an experiment on this optical deflector as it is equipped with a larger polygonal mirror (octahedron whose distance between opposing faces is 70 mm$^\phi$) that is set up in an ambient temperature of 60° C. and rotated at a speed of 12,000 rpm, the splashing of grease occurred very soon. In other words, the rotating larger polygonal mirror worked like a cross-flow fan, which aspirated the surrounding air by a force strong enough to overcome the aforementioned forced air stream flowing towards the rotating center axis. Another factor that must be considered is that the viscosity of the grease decreased in the hot environment and became more prone to splashing.

SUMMARY OF THE INVENTION

The present invention has been accomplished under these circumstances and has as an object blocking the "negative" pressure that would otherwise develop in the space between a fixed member and a rotating member, so as to prevent the splashing of grease in an optical deflector that uses ball bearings and to prevent galling in an optical deflector that uses a dynamic pressure spindle.

This object can be attained by an optical deflector that comprises a rotating shaft that is supported freely rotatable on the body of a motor, as well as an optical deflecting element and a magnet that are both fitted around the rotating shaft, which is characterized in that a turbulence forming member by which the air stream generated by the rotation of the optical deflecting element is transformed to turbulences is provided in the neighborhood of the rotating element that is composed of the rotating shaft, the optical deflecting element and the magnet.

The rotating polygonal mirror aspirates air from both above and below and discharges it in a laminar flow from the neighborhood, thereby creating "positive" pressures. As a reaction to this phenomenon, the pressure in the space between the stator coil base (fixed member) and the magnet (rotating member) indicates a very great "negative" value. In accordance with the present invention, the turbulence forming member blocks the air aspiration by the polygonal mirror from above and below so as to insure that the air being discharged from the neighborhood of the polygonal mirror is transformed to turbulences as much as possible while, at the same time, the creation of a "negative" pressure in the space between the stator coil base and the magnet is blocked,

BRIEF DESCRIPTION OF THE DRAWINGS

In the accompanying drawings;

FIG. 7 is a graphic diagram illustrating the operating principle of a dynamic spindle motor.

DETAILED DESCRIPTION OF THE PREFERRED EMBODIMENT

Figure 1A:
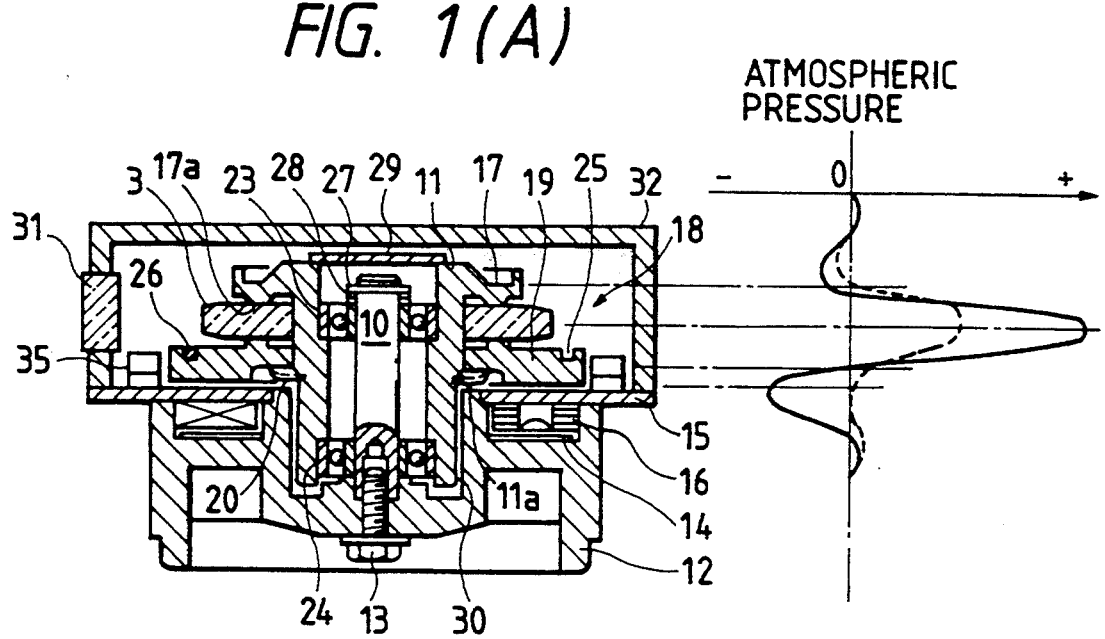
FIG. 1(A) is a sectional view showing an optical deflector according to a first embodiment of the present invention.
Figure 1B:
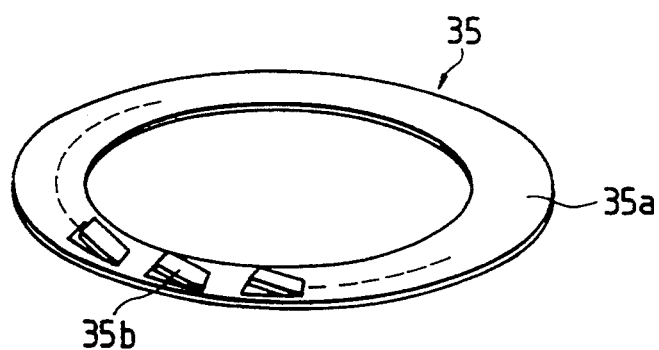
FIG. 1(B) is a perspective view of the turbulence forming member in the optical deflector shown in FIG. 1(A)
Figure 1C:
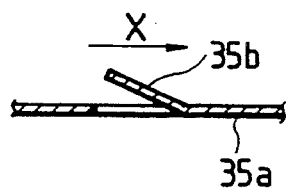
FIG. 1(C) is a section of FIG. 1(B)

The preferred embodiments of the present invention are described below with reference to accompanying drawings FIG. 1(A) is a sectional view showing an optical deflector according to a first embodiment of the present invention; FIG. 1(B) is a perspective view of the turbulence forming member in the optical deflector shown in FIG. 1(A); and FIG. 1(C) is a section of FIG. 1(B), The following description is directed to the case where a polygonal mirror is used as an optical deflecting element but this is not the sole case of the present invention and it should be understood that the present invention is applicable to any types of optical deflecting elements such as hologram disks that deflect an information carrying light beam in predetermined directions for scanning purposes.

Figure 8:
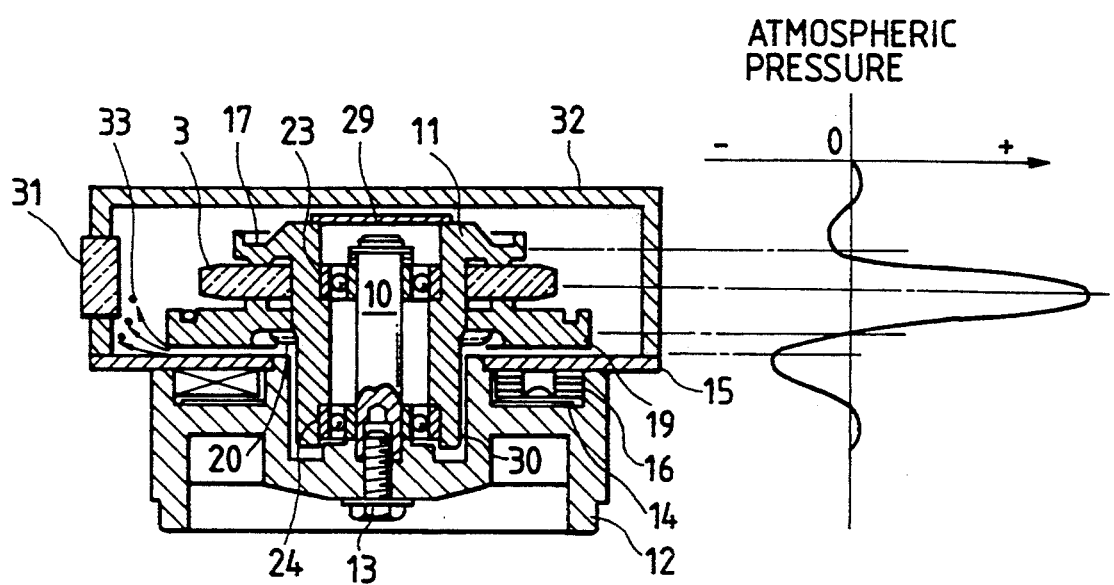
FIG. 8 is a sectional view showing another prior art optical deflector.

The first embodiment of the present invention relates to an improvement of the conventional optical deflector shown in FIG. 8. As shown in FIG. 1(A), a stationary shaft 10 is secured to the body of a motor 12 by means of a screw 13. An annular stator yoke 14 that is made of either a ferrous metal or ferrite is secured to the motor body 12 by means of a screw or adhesive. Provided on top of the stator yoke 14 is a stator coil 16 that is secured to a stator coil base 15. When the stator coil 16 is supplied with a current from a control circuit (not shown), a magnetic field is created both above and below the coil. To improve the efficiency of motor operation, the stator yoke 14 works to reorient the downward magnetic field to be directed upward.

Two ball bearings 23 and 24 are fitted around the stationary shaft 10, which in turn is fitted into a cylindrical rotating shaft 11. A flange 17 is formed around the rotating shaft 11 as an integral part and the underside of the flange 17 is worked to form an annular reference face 17a that serves to assure the necessary horizontal precision for the rotating faces of a polygonal mirror 3. The polygonal mirror 3 and a magnet 19 are fitted over the rotating shaft 11 in a position that is below the flange 17. Thus, the rotating shaft 11, the polygonal mirror 3 and the magnet 19 combine to form a rotating element 18. A groove 11a is formed in the surface of the rotating shaft 11. A leaf spring 20 is placed between the groove 11a and the magnet 19 to establish elastic engagement as shown in FIG. 6(B).

The magnet 19 is provided with a balance groove 25 for dynamic balance adjustment and a balancing weight 26 of an appropriate mass in the balance groove 25 in an appropriate position. A ring 27 is secured to the stationary shaft 10 in such a position that a pressurizing spring 28 applies a "preload", or a force that depresses the inner race of the ball bearing 23 downward and the inner race of the ball bearing 24 upward. The top of the rotating shaft 11 is closed with a seal 29 in the form of a high-polymer sheet or a metal plate that is bonded with an adhesive or a tackifier to prevent grease from splashing up out of the shaft 11 as the ball bearings 23 and 24 continue to rotate. The lower part of the rotating shaft 11 is provided with labyrinth grooves 30 in the space between the motor body 12 and the rotating shaft 11. A cover 32 fitted with a light-transparent window glass 31 is secured to the motor body 12 by a suitable member such as screws (not shown) and serves to render the rotating element 18 both soundproof and dust-proof.

The optical deflector described above has basically the same construction as the conventional version shown in FIG. 8, except that a turbulence forming member 35 is secured around the rotating element 18 on the motor body 12 through the stator coil base 15 by means of an adhesive or screws (not shown). To assure that it is not interfere with the magnetic field to be formed between the stator coil 16 and the magnet 19, the turbulence forming member 25 is preferably formed of a high-polymer sheet or a nonmagnetic metal plate. As shown in FIGS. 1(B) and 1(C), the turbulence forming member 35 consists of an annular part 35a and fins 35b that are formed simultaneously with the annular part 35a by blanking with a press. The fins 35b are cut and bent in a direction that is against the direction X in which the polygonal mirror 3 rotates.

The height of the fins 35b may occasionally be adjusted in a direction parallel to the rotating center axis in order to achieve further decrease in value of the "positive" peak in the graph shown on the right side of FIG. 1(A). In this case, the turbulence forming member 35 may sometimes be mounted on the motor body 12 with a spacer or struts being interposed.

The optical deflector having the construction described above is operated in the following manner. In the absence of the turbulence forming member 35, the space around the rotating polygonal mirror 3 creates a very high "positive" pressure as indicated by the solid line in FIG. 1(A) whereas the pressure in the gap between the stator coil base 15 and the magnet 19 produces a very large "negative" pressure. To repeat the already-described reason for these phenomena, the rotating polygonal mirror 3 aspirates air both from above and below and the resulting laminar flow of air is ejected to produce pressures that peak at the greatest "positive" value in the graph of the FIG. 1(A). As the reaction to this formation of "positive" pressures, the pressure in the space between the stator coil base 15 and the magnet 19 indicates a very large "negative" value.

In the first embodiment, the fins 35b effectively block the aspiration of air by the polygonal mirror 3 from both above and below and, as a result, not only can the air stream being discharged from the neighborhood of the polygonal mirror 3 be transformed to turbulences as much as possible but, at the same time, the creation of a "negative" pressure in the space between the stator coil base 15 and the magnet 19 is also blocked. As a result, it is verified by experiments that the pressure distribution under the cover became less abrupt as indicated by the dashed line in FIG. 1(A). Stated more specifically, the value of the "positive" pressure developing around the polygonal mirror 3 decreased and so did the absolute value of the "negative" pressure developing in the gap between the stator coil base 15 and the magnet 19. Thus, in accordance with the present invention, the splashing of grease is prevented completely over an extended period and, at the same time, there is provided an optical deflector that is simple in construction and which yet is capable of effective prevention of grease splashing.

It should be noted here that the fins 35b must be bent in a direction that is against the direction X in which the polygonal mirror 3 rotates as shown in FIG. 1(C). None of the intended effects could be attained in an experiment on the fins that are bent in a direction substantially following the direction X.

Figure 2A:
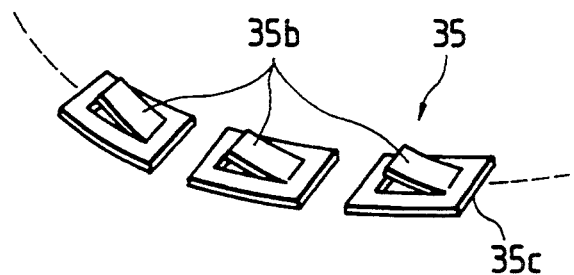
FIGS. 2(A) to 2(E) are diagrams showing various modifications of the turbulence forming member in the optical deflector shown in FIG. 1(A)
Figure 2B:
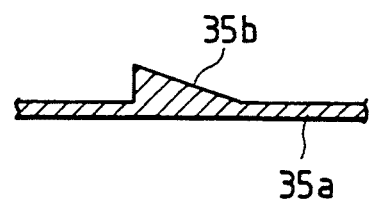
Figure 2C:
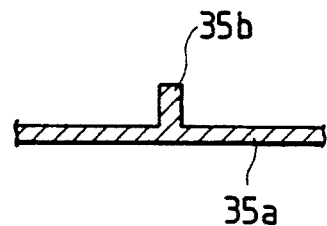
Figure 2D:
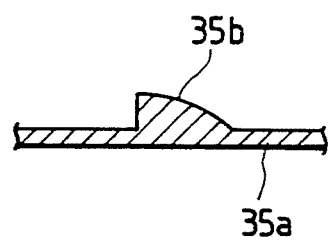
Figure 2E:
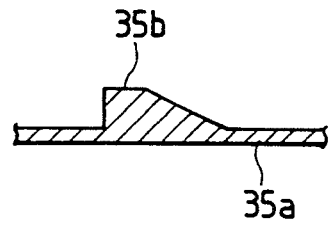

FIGS. 2(A) to 2(E) show various modifications of the turbulence forming member 35 in the optical deflector best shown in FIG. 1(B). As shown in FIG. 2(A), the fins 35b are not formed on the annular member but on arcuate segments 35c that are arranged on a circle substantially concentric with the rotating center axis, so that the pressure distribution indicated by the dashed line in FIG. 1(A) is uniform at all points on the circumference of the rotating element. FIGS. 2(B) to 2(E) show various modifications of the turbulence forming member 35 in which fins 35b of a certain shape are not cut in the annular member 35a but formed as integral parts of those members.

Figure 3:
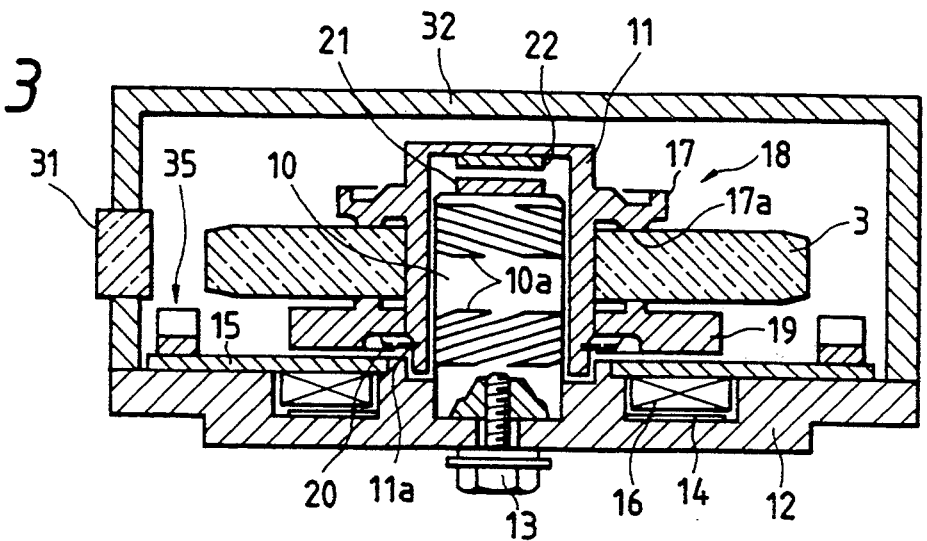
FIG. 3 is a sectional view showing an optical deflector according to a second embodiment of the present invention.
Figure 6A:
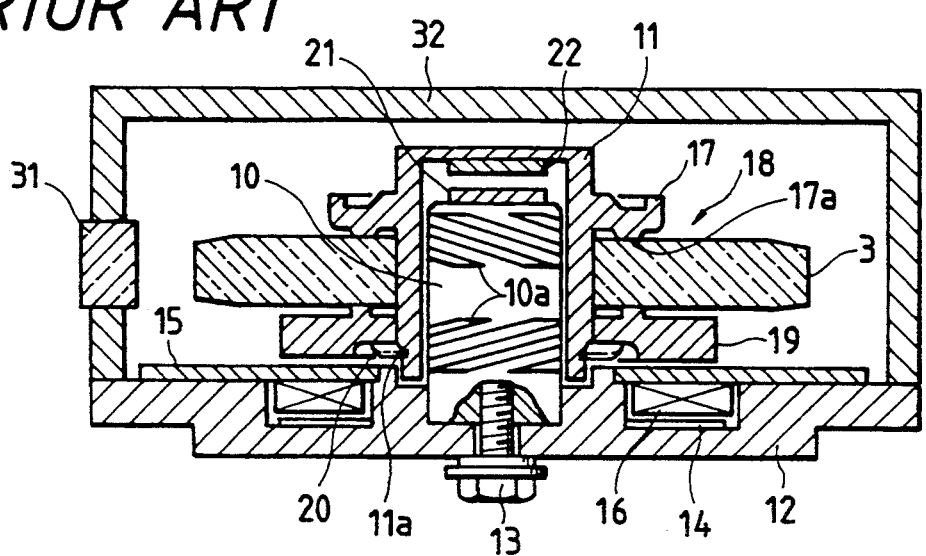
FIG. 6(A) is a sectional view showing a conventional optical deflector.
Figure 6B:
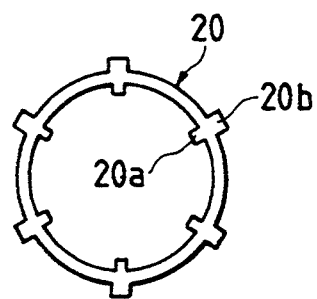
FIG. 6(B) is a plan view of the leaf spring in the optical deflector shown in FIG. 6(A)
Figure 6C:
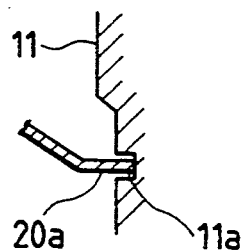
FIG. 6(C) is an enlarged sectional view of the rotating shaft in the optical deflector shown in FIG. 6(A)

FIG. 3 shows an optical deflector according to a second embodiment of the present invention, which is an improvement of the embodiment best shown in FIG. 6(A) that uses a dynamic pressure spindle. In FIG. 3, the components that are the same as those corresponding to the conventional optical deflector shown in FIG. 6(A) are identified by like numerals and not described in detail. In the second embodiment under consideration, a turbulence forming member 35 of the same design as best shown in FIG. 1(B) is provided with the same operation as described with reference to FIG. 1(A) to produce a less abrupt pressure distribution under the cover 32. As a consequence, the dynamic pressure distribution produced by the dynamic pressure spindle returns to the normal curve indicated by the solid line in FIG. 7 and, hence, it becomes possible to prevent the galling of the dynamic pressure spindle due to the decrease in the rigidity of the bearing.

Figure 4A:
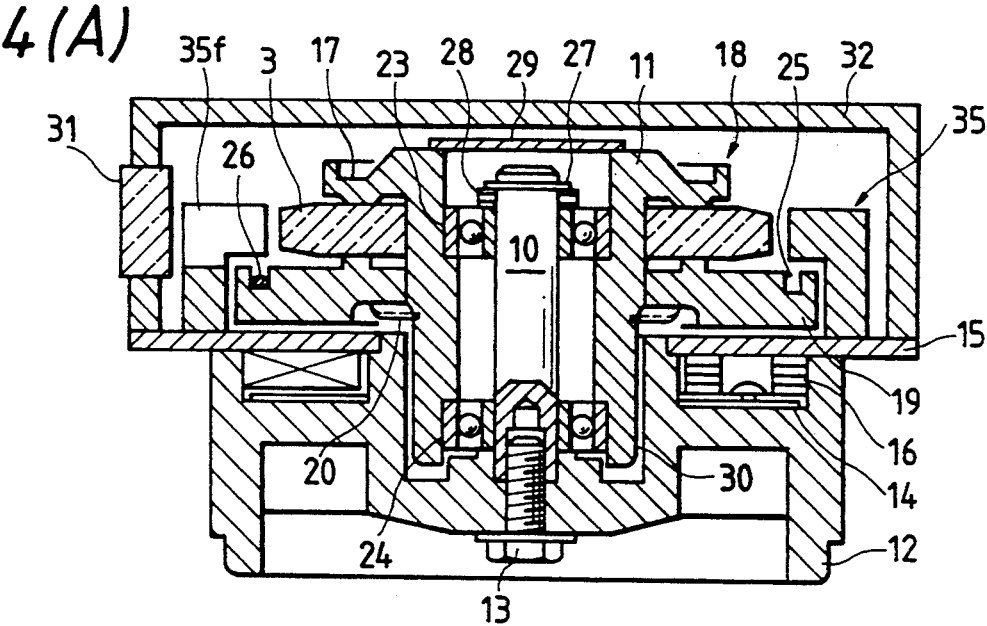
FIG. 4(A) is a sectional view showing an optical deflector according to a third embodiment of the present invention.
Figure 4B:
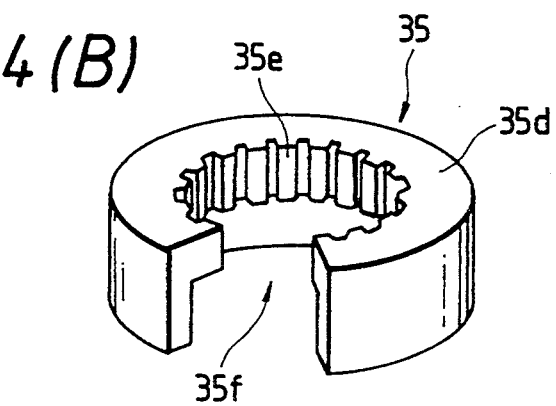
FIG. 4(B) is a perspective view of the turbulence forming member in the optical deflector shown in FIG. 4(A)
Figure 5:
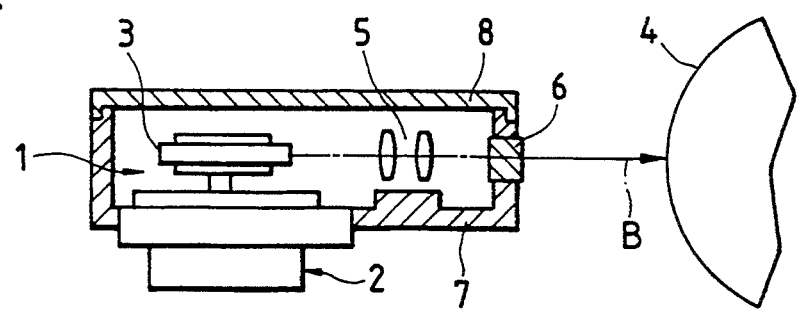
FIG. 5 is a diagram showing the general concept of an optical scanning unit.

Each of FIGS. 4(A) and 4(B) shows an optical deflector according to a third embodiment of the present invention. In the third embodiment, the components that are the same as those corresponding to the optical deflector of the first embodiment are identified by like numerals and not described in detail. In the third embodiment under consideration, a turbulence forming member 35 is provided on the stator coil base 15 in an area near the outer circumference of the polygonal mirror 3. The turbulence forming member 35 is an annular member 35d that has a corrugated inner surface 35e as shown in FIG. 4(B), with the wall being partly cut off to form an opening 35f. The cut area 35f corresponds in position to the window glass 31 in the cover 32 to insure that the member 35 does not interfere with the entrance of incoming or outgoing light such as laser light. The turbulence forming member 35 is secured on the motor body 12 through the stator coil base 15 with the aid of an adhesive or by some other suitable members. The turbulence forming member 35 is secured in such a position that the center axis on the inside diameter of the annular member 35d substantially coincides with the rotating center axis of the polygonal mirror 3.

If necessary, the turbulence forming member 35 may not be secured onto the stator coil base 15 but to the ceiling of the cover 32.

For the same reason as set forth above in connection with the first embodiment, the rotating element 18 of the optical deflector produced an air pressure distribution curve that is identical to the curve indicated by the dashed line in FIG. 1(A); hence, the optical deflector of the third embodiment attained the same advantages as those of the first and second embodiments and could be produced at substantially the same cost as is necessary to prepare the optical deflector of the first embodiment. It is also verified by experiments that when the turbulence forming member 35 is made of a vibration damping material such as rubber or sponge, it exhibited the ability to suppress the vibration of the stator coil base 15. In test runs that are conducted with the height of the turbulence forming element 35 in a direction parallel to the rotating center axis of the polygonal mirror 3 being limited not to exceed the thickness of the magnet 19 (i.e., not to exceed the bottom surface of the polygonal mirror 3), the splashing of grease occurred in the long run. However, this problem could be solved by extending the height of the turbulence forming member 35 up to the top surface of the polygonal mirror 3.

While the three embodiments of the present invention have been described above, it should be noted that these are not the sole cases of the present invention and that various alterations or modifications can be made by one having ordinary skill in the technical field to which the present invention belongs. For instance, the three embodiments refer to the case where the space in which the polygonal mirror rotates is closed with a cover. However, the same advantages are attained by the present invention even if it is applied to an optical deflector in which the space of rotation is not closed with a cover.

The embodiments described above refer to the optical deflector that has the rotating element supported freely rotatable around the stationary shaft but, needless to say, the concept of the present invention is also applicable to an optical deflector of such a type that the rotating element is supported freely rotatable within the stationary shaft or the body of a motor.

As described above, the present invention provides an optical deflector that comprises a rotating shaft that is supported freely rotatable on the body of a motor, as well as an optical deflecting element and a magnet that are both fitted around the rotating shaft, which is characterized in that a turbulence forming member by which the air stream generated by the rotation of the optical deflecting element is transformed to turbulences is provided in the neighborhood of the rotating element that is composed of the rotating shaft, the optical deflecting element and the magnet. This arrangement is effective in blocking the "negative" pressure that would otherwise develop in the space between the fixed member (i.e., stator coil base) and the rotating member (i.e., magnet); as a result, the grease can be prevented from splashing under the cover of an optical deflector that uses ball bearings; in the case of an optical deflector that uses a dynamic pressure spindle, the galling of the spindle can be prevented.

What is claimed is:

1. An optical deflector, comprising:
    a motor body;
    a rotatable shaft supported rotatably on said motor body;
    an optical deflecting element fitted around said rotatable shaft;
    a magnet fitted around said rotatable shaft between said optical deflecting element and motor body; and
    a stationary annular turbulence forming member secured on said motor body around said magnet, said turbulence forming member including a plurality of projections oriented at an acute angle with respect to the motor body, whereby rotation of said optical deflecting element is in a direction into the acute angle between each projection and the motor body so that said projections interrupt and make turbulent the flow of air generated by said rotation.

2. The optical deflector of claim 1, wherein said projections comprise fins that are formed simultaneously with said annular portion by blanking with a press.

3. The optical deflector of claim 1, wherein said turbulence forming member comprises a plurality of arcuate segments that are arranged on a circle substantially concentric with a rotating center axis of said rotating shaft.

4. An optical deflector, comprising:
    a motor body;
    a rotatable shaft supported rotatably on said motor body;
    an optical deflecting element fitted around said rotatable shaft;
    a magnet fitted around said rotatable shaft between said optical deflecting element and said motor body; and
    a turbulence forming member secured on said motor body for transforming an airstream generated by rotation of said optical deflecting element to turbulences, said turbulence forming member being positioned around said magnet, and said turbulence forming member comprising an annular member that has a corrugated inner surface, said annular member being partly cut off to form an opening.

* * * * *